May 18, 1926. 1,585,427
G. E. SIMS
SHOCK ABSORBER AND SNUBBER
Filed Nov. 8, 1923   2 Sheets-Sheet 1
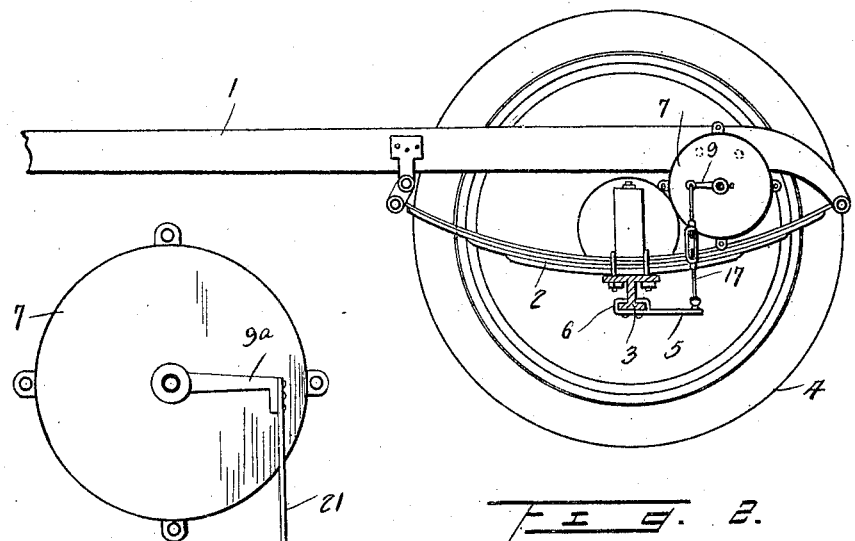
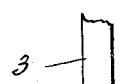
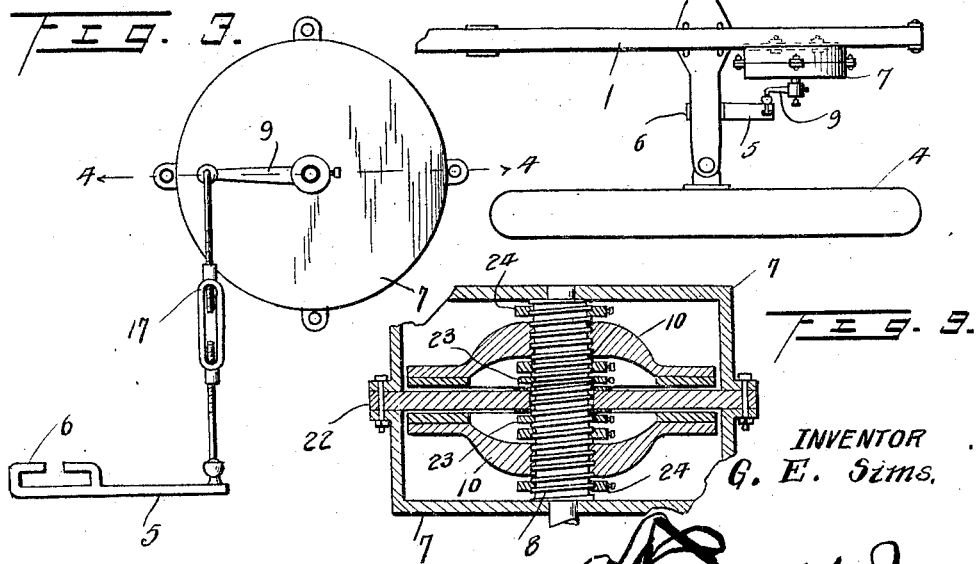
INVENTOR
G. E. Sims.
BY *A. Randolph Jr.*
ATTORNEY May 18, 1926.
G. E. SIMS
1,585,427
SHOCK ABSORBER AND SNUBBER
Filed Nov. 8, 1923   2 Sheets-Sheet 2
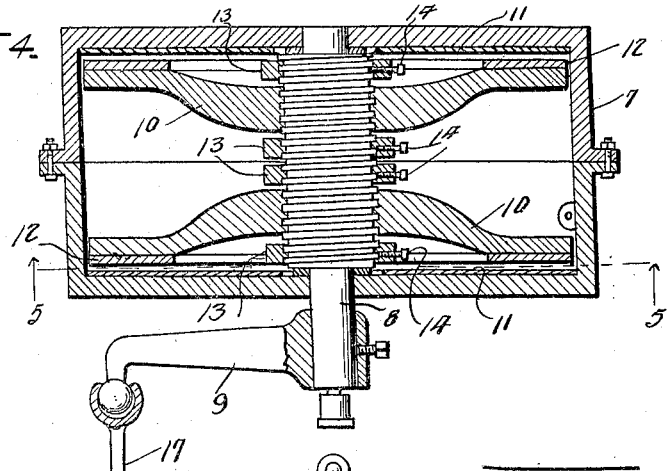
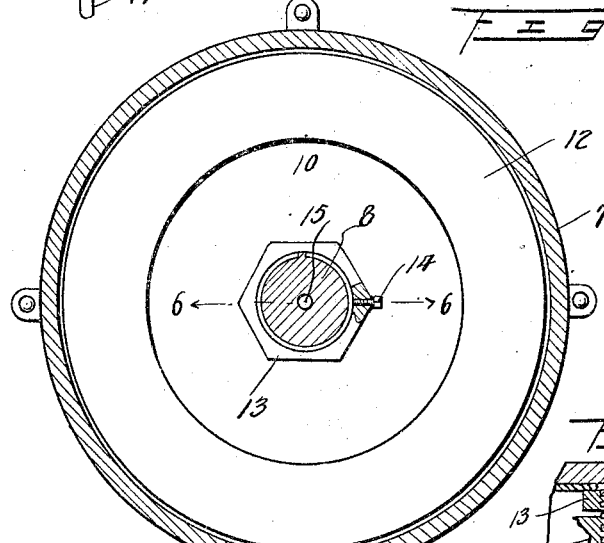
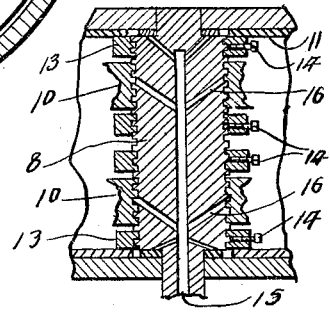
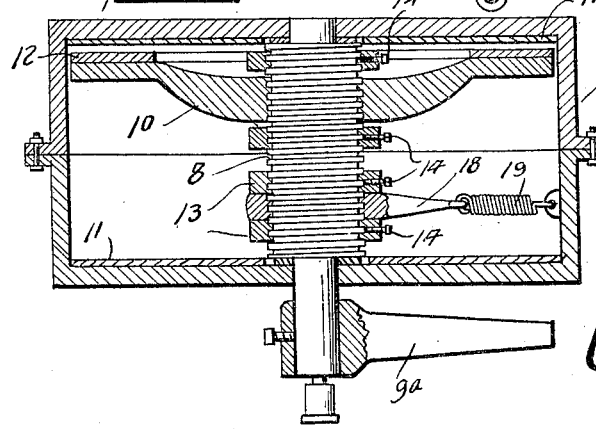
INVENTOR.
G. E. Sims.
BY
ATTORNEY.

Patented May 18, 1926.

1,585,427

UNITED STATES PATENT OFFICE.

GLEN E. SIMS, OF ST. ANTHONY, IDAHO.

SHOCK ABSORBER AND SNUBBER.

Application filed November 8, 1923. Serial No. 673,565.

The invention relates to means for neutralizing shock and vibration and preventing the rebound of a vehicle when traveling over rough roads, or dropping into a rut or depression, or passing over an obstruction, and has for its object to provide an appliance which may be readily installed without necessitating any change in the construction of the vehicle and which is effective in operation for the purpose intended.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a side view showing the application of the invention,

Figure 2 is a top plan view of the parts illustrated in Figure 1,

Figure 3 is an elevational view of the appliance,

Figure 4 is a horizontal section on the line 4—4 of Figure 3, showing the parts on a larger scale, Figure 5 is a detail sectional view on the line 5—5 of Figure 4, Figure 6 is a detail sectional view on the line 6—6 of Figure 5, Figure 7 is a view similar to Figure 4 of a modification, Figure 8 is a side view of the modification showing the parts on a reduced scale, and Figure 9 is a further modification.

The numeral 1 designates a side bar, 2 a side spring, 3 an axle and 4 a wheel of a motor vehicle of ordinary construction, the same being shown to demonstrate the application of the invention.

The appliance comprises an arm 5 having a clip 6 at one end whereby to attach the arm to the axle 3. A housing 7 is adapted to be attached to the side bar 1 or other convenient part of the vehicle frame and contains the shock absorbing and snubbing mechanism. The housing or casing 7 is preferably of sectional formation to admit of the ready assembling of the parts and access thereto for repairs as occasion may require. A threaded shaft 8 is journaled in the side walls of the housing 7 and one of the journals is extended and receives an arm 9 which is fast thereto. Disks 10 are mounted upon opposite end portions of the shaft 8 and have screw thread connection therewith. Said disks 10 are relatively heavy due to their form as shown, and specifically of such weight that while moving longitudinally of the shaft 8, they may lag with respect to that shaft and associated parts incidental to quick motion of said shaft on rebound of the vehicle spring. Suitable lining 11 and 12 is applied to the opposing sides of the end walls of the casing and the disks 10 and sustains the wear and insures frictional contact of the parts sufficient to effect the desired result. Stop collars 13 are threaded upon the shaft 8 and are adapted to be secured in the adjusted position by means of set screws 14. Each of the disks 10 is confined between a pair of stop collars which limits the movement thereof. As shown most clearly in Figure 6, the threaded shaft 8 has an axial opening 15 and lateral openings 16 in communication with the axial opening. The openings 15 and 16 constitute oil passages whereby lubricant is supplied to the disks 10.

As hereinbefore stated, the housing or casing 7 is attached to the frame of the vehicle and the arm 5 to the axle. An adjustable connection 17 is interposed between the arms 9 and 5 and includes a turnbuckle, and in this manner, provision is had for adapting the appliance to various makes of vehicles.

In the modification shown in Figures 7 and 8, one of the disks 10 is dispensed with and is supplanted by an arm 18 which is threaded upon the shaft 8 and secured thereto between a pair of stop collars 13. A helical spring 19 connects the outer end of the arm 18 with the outer wall of the housing 7. This form of appliance is designed as a snubber for checking the rebound of a vehicle. The outer end of the arm 9ª fast to the projecting end of the shaft 8 is adapted to be connected by means of a strap 21 with the axle.

When the appliance is installed, the arms 9 and 5 are disposed horizontally and movement of the frame of the vehicle causes the free end of the arm 9 to move up or down, thereby rotating the shaft 8 in a clockwise or counter-clockwise direction and bringing one of the relatively heavy disks 10 into frictional engagement with a side wall of the housing, thereby preventing sudden movement in either direction with the result that shock and vibration are compensated for and neutralized in that the weight of said disks 10 cause them to lag and move longitudinally of shaft 8 due to quick motion of the shaft 8 on rebound of the vehicle springs. In the modification shown in Figures 7 and 8, when the car starts on the rebound stroke, arm 9ª is pulled down turning shaft 8 which forces disk 10 into contact with the wall or housing until arm 9ª has turned until it is pointing straight down toward the car axle. As soon as the momentum of the car ceases the arm releases the disk and the coil spring 19 pulls the arm 18 back into its natural position keeping the strap 21 tight at all times.

In the modification shown in Figure 9, the housing or casing 7 has a plate 22 bolted between the section comprising the same and the shaft 8 passes loosely therethrough. Stop collars 23 secured to the shaft 8 and disposed upon opposite sides of the plate 22 sustain the end thrust. The disks 10 are reversed and coact with the plate 22 in substantially the same manner as with the end walls of the casing, as herein stated. Stop collars 24 limit the outward movement of the disks 10.

What is claimed is:

1. In an appliance of the character specified, a housing, a threaded shaft journaled in the housing, and braking means carried by said shaft, said braking means being adapted to coact with the wall of the housing when the shaft is rotated in one direction and to be released therefrom when rotated in the opposite direction.

2. In an appliance of the character specified, a housing, a threaded shaft journaled in the housing, a brake member threaded on the shaft and adapted to coact with the side wall of the housing when the shaft is rotated in one direction, and resilient means connected with said shaft to return the shaft to normal position after rotation to apply the brake member.

3. An appliance of the character specified, comprising a housing rigidly carried by a chassis or the like, a threaded shaft journaled within the housing, a disk threaded upon the shaft and movable thereby into and out of engagement with a side wall of the housing, an arm mounted upon said shaft, a helical spring connecting the outer end of the arm with the housing, and stop collars on the shaft and having the brake member and arm disposed therebetween.

In testimony whereof I affix my signature.

GLEN E. SIMS.